United States Patent [19]

Lisiecki et al.

[11] 4,085,885
[45] Apr. 25, 1978

[54] LIQUID PROOF FLAT TOP CONTAINER WITH THUMB NOTCH RELEASE MEANS

[75] Inventors: Robert E. Lisiecki, Orchard Lake; Duncan J. Crawford, Franklin; Daniel J. Wise, Farmington, all of Mich.

[73] Assignee: Ex-Cell-O Corporation, Troy, Mich.

[21] Appl. No.: 707,969

[22] Filed: Jul. 23, 1976

[51] Int. Cl.² .................. B65D 5/72; B65D 5/54
[52] U.S. Cl. .................... 229/17 R; 206/613
[58] Field of Search ........... 229/17 G, 51 D, 51 AS, 229/51 TC, 51 TS

[56] References Cited

U.S. PATENT DOCUMENTS

| | | | |
|---|---|---|---|
| 2,416,332 | 2/1947 | Lehman | 229/17 G X UX |
| 2,959,336 | 11/1960 | Mosse et al. | 229/17 G UX |
| 3,039,668 | 6/1962 | Kuchenbecker | 229/17 G |
| 3,147,904 | 9/1964 | Larson | 229/17 R |
| 3,162,349 | 12/1964 | Kelly | 229/17 G |
| 3,270,940 | 9/1966 | Egleston et al. | 229/17 G |
| 3,795,359 | 3/1974 | Rausing | 229/51 D |
| 3,869,078 | 3/1975 | Braun | 229/17 R |
| 3,892,347 | 7/1975 | Egleston | 229/17 R |
| 3,985,287 | 10/1976 | Stetler | 229/DIG. 9 |

FOREIGN PATENT DOCUMENTS

| | | | |
|---|---|---|---|
| 491,330 | 3/1953 | Canada | 229/17 G |
| 1,030,244 | 5/1958 | Germany | 229/17 G |
| 1,289,481 | 2/1969 | Germany. | |
| 1,193,790 | 5/1965 | Germany | 229/DIG. 9 |

Primary Examiner—Davis T. Moorhead

[57] ABSTRACT

A liquid proof coated paperboard container having a flat top end closure which can be opened exposing a reclosable pouring spout, and having a unique closing arrangement including a central seal and a sealed hold down tab provided with a thumb notch release means.

23 Claims, 22 Drawing Figures

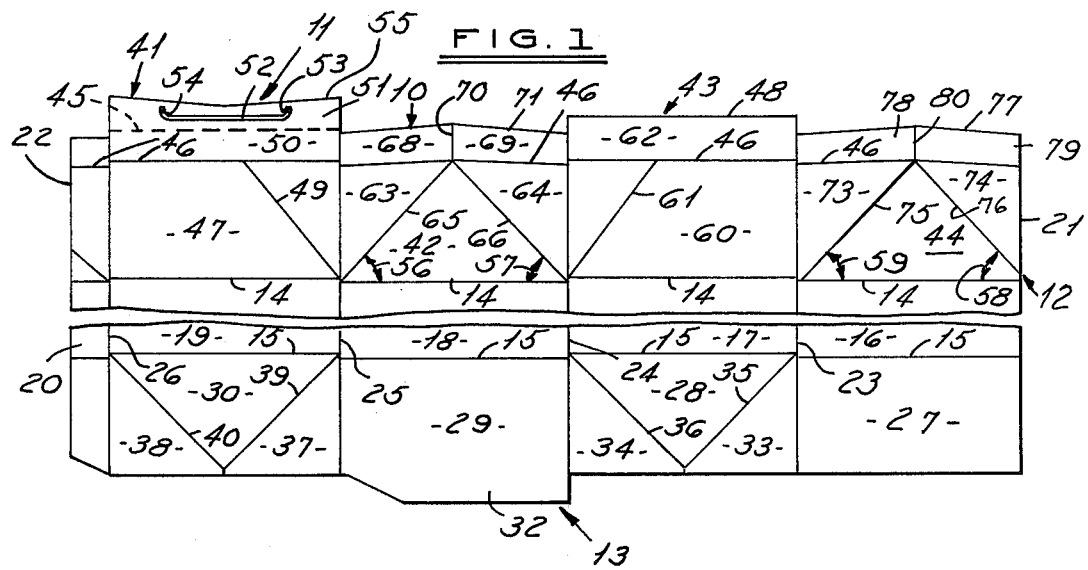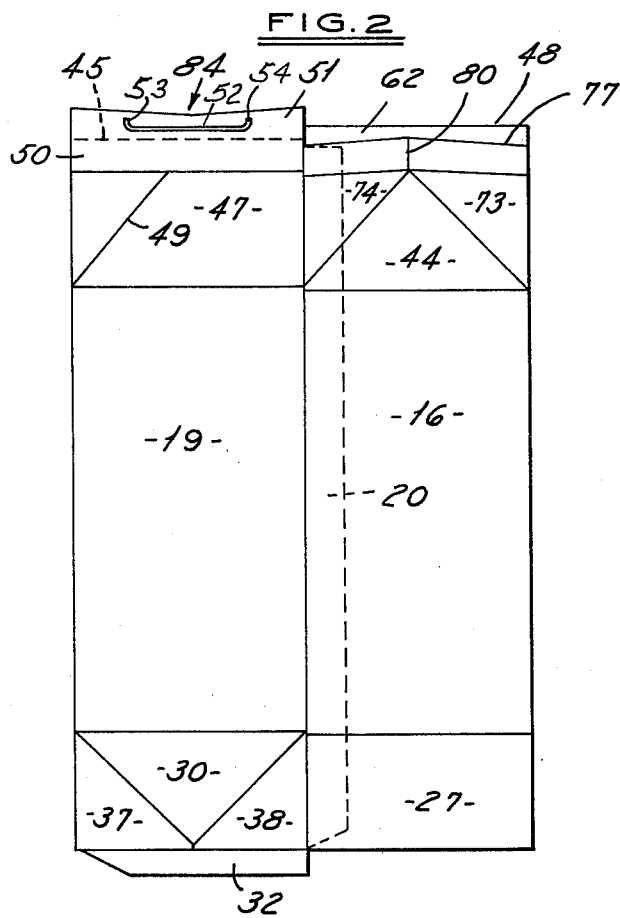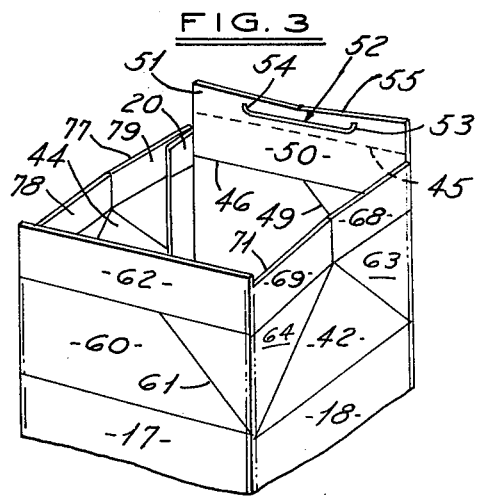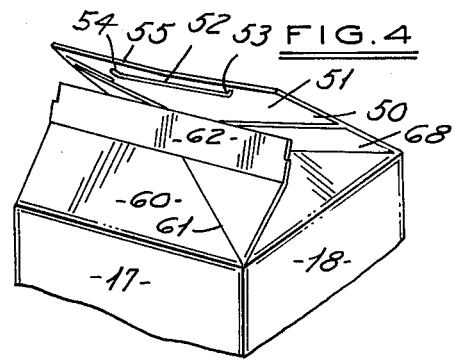

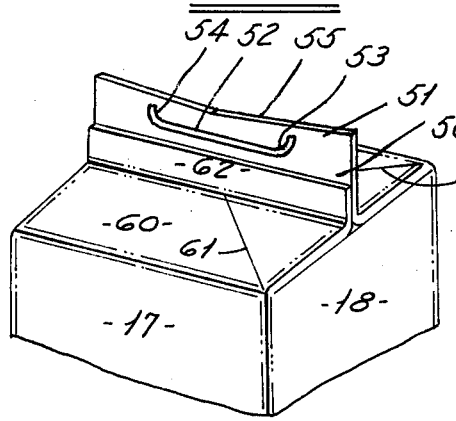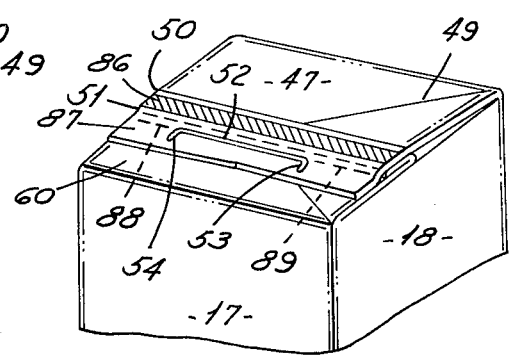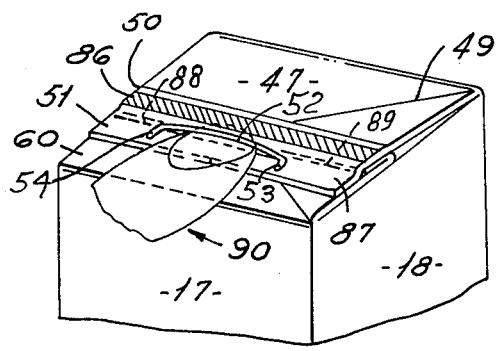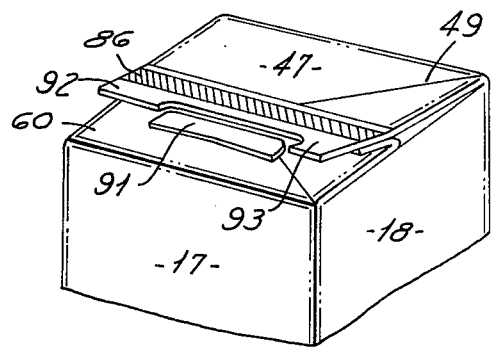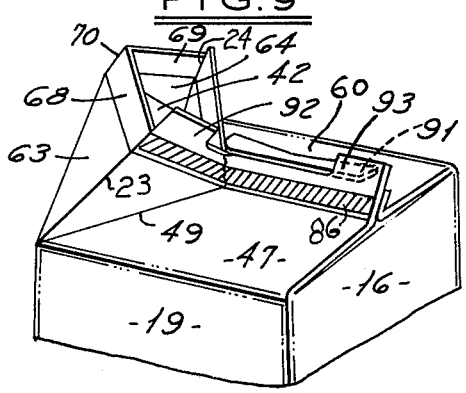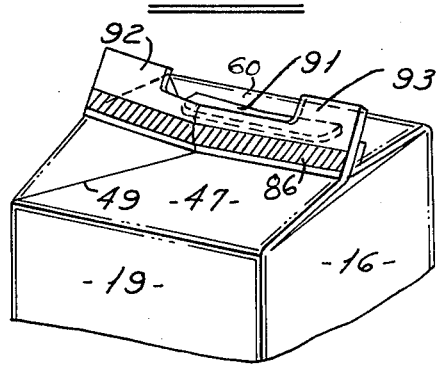

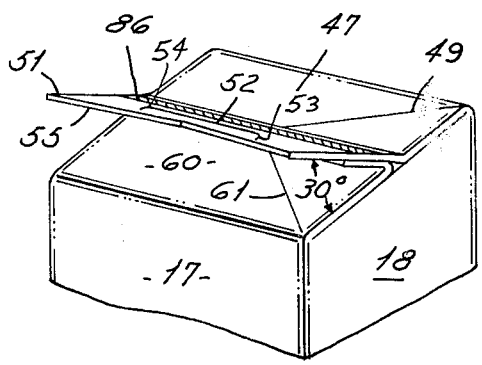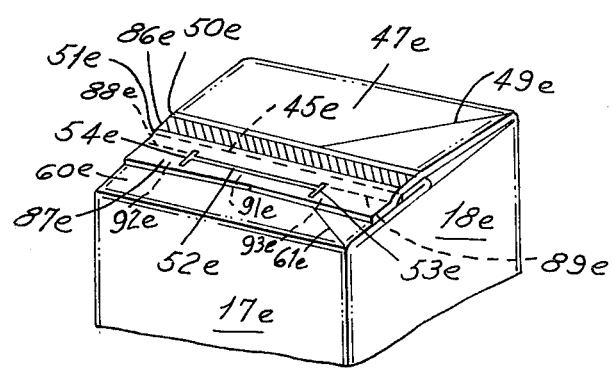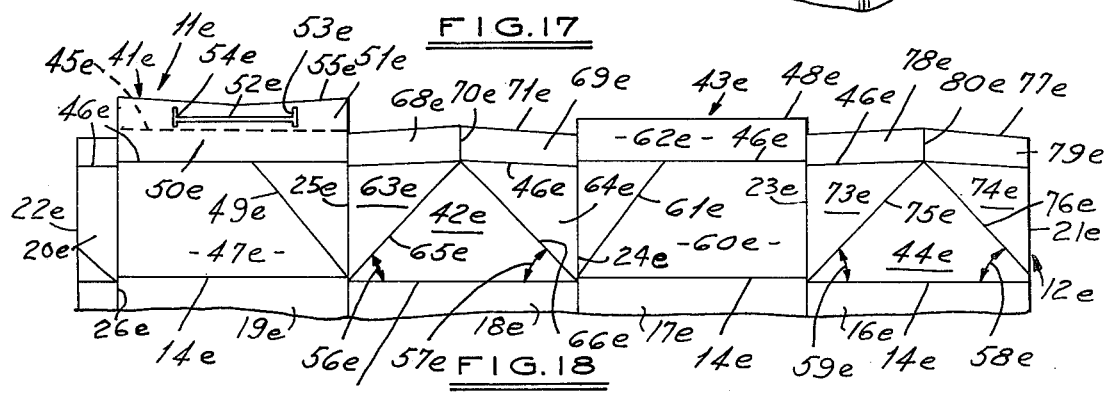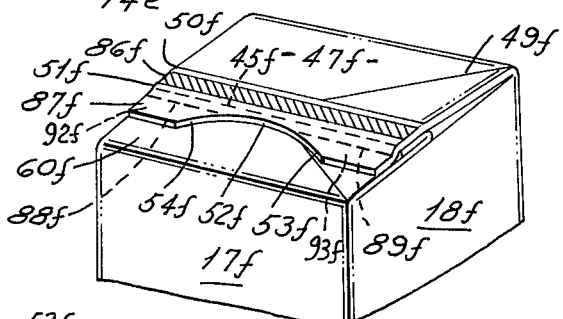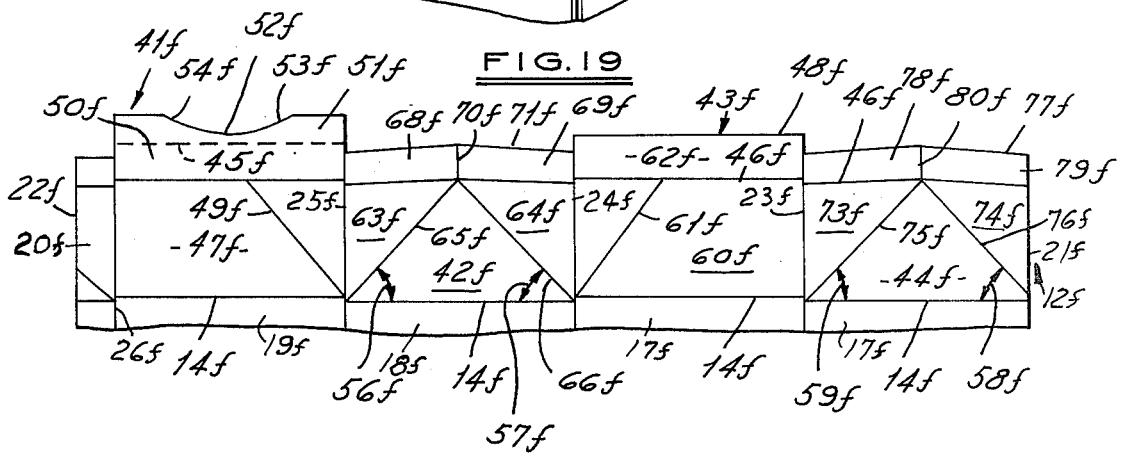

LIQUID PROOF FLAT TOP CONTAINER WITH THUMB NOTCH RELEASE MEANS

BACKGROUND OF THE INVENTION

1. Field of the Invention

The invention relates to coated paperboard containers which have a flat top end closure with a hidden pouring spout that can be moved to an open position, and a pouring spout that can be reclosed for protective storage.

2. Description of Prior Art

It is known in this art to use flat top end closures with reclosable pouring spouts and gable top end closures with reclosable pouring spouts. Heretofore, flat top end containers with an inherent pouring spout have been provided, and have received limited commercial use, and an example of this type container is illustrated in U.S. Pat. Nos. 3,147,904, and 3,869,078. Gable top containers with an inherent pouring spout are known and have had wide commercial use, and an example of this type container is illustrated in U.S. Pat. No. 3,270,940.

SUMMARY OF THE INVENTION

The present invention relates to the coated paperboard container art, and more particularly, to a unique coated paperboard container blank, and a flat top container formed therefrom which is provided with a hold down tab having unique thumb notch release means.

The coated paperboard container is provided with a flat top end closure having full outer and partial inner roof panels extending over the container end as external members, and two triangular panel members, each having a pair of fold back panels connecting them to said roof panels, which are positioned under the roof panels in the closed position. The flat top end closure structure is sealed at two locations. A first sealing area is provided by a seal at the central area, and a second sealing area is provided by a seal between the outer surface of the outer roof panel and a hold down tab that is connected to the edge of the partial inner roof panel.

The hold down tab is provided with a thumb notch release means which comprises a cut line formed in the hold down tab, whereby a user's thumb may be inserted in the cut line, and with a simple pivoting motion of the thumb provide a simultaneous downward and upward pressure which releases the hold down tab from the inner roof panel to permit further opening of the sonic seal for dispensing the contents of the container. The container includes a pouring spout which can be opened after the sonic seal is broken, and which is similar to the pouring spout of the standard gable top container presently available on the market.

The thumb notch release means may take different forms. In one embodiment, the thumb notch release means comprises a U-shaped cut line, formed through the hold down tab, with an elongated straight line portion and connecting arcuate end portions which extend toward the outer end edge of the hold down tab. In another embodiment, the thumb notch release means comprises an I-shaped cut line, with the longest dimension disposed longitudinally of the hold down tab, and with a pair of straight end portions disposed perpendicular to an elongated straight portion and communicating therewith. In still another embodiment, the thumb notch release means comprises a notch formed in the outer end edge of the hold down tab. The last mentioned notch may take different shapes, as for example, it may be shaped concave inwardly.

The outer end edge of the hold down panel may be straight or it may be provided with an inwardly extended recess such as a V-shaped recess. The outer end edges of each of the fold back panels may be straight or they may be provided with an inverted V-shaped outer edge. The edge height dimensions of each pair of the fold back panels may be formed to equal dimensions or unequal dimensions.

Other objects, features and advantages of the invention will be apparent from the following detailed description, appended claims, and the accompanying drawings.

BRIEF DESCRIPTION OF THE DRAWINGS

FIG. 1 is a broken, layout view of the inside surface of a tab top container blank with thumb notch from which is formed a liquid proof flat top container made in accordance with the principles of the present invention.

FIG. 2 is a layout view of the outside surface of a tab top container structure after it is side seamed from the tab top container blank illustrated in FIG. 1.

FIG. 3 is a fragmentary perspective view, showing the side seamed tab top container blank illustrated in FIG. 2 in an open ended top end view prior to the closing of the flat top end closure structure of the present invention.

FIG. 4 is a fragmentary perspective view, similar to FIG. 3, and showing the tab top container blank of FIG. 3 in a partially closed condition.

FIG. 5 is a fragmentary perspective view showing the tab top container blank of FIGS. 3 and 4 with the sealing panels in vertical position to permit sonic sealing of the central area of the container top end closure structure to provide a liquid proof seal for the container.

FIG. 6 is a fragmentary perspective view showing the tab top container blank illustrated in FIGS. 3, 4 and 5 after the central area of the top end closure structure has been sonically sealed, and the hold down tab with thumb notch release means on the outer roof panel has been sealed to the outer surface of the inner roof panel to provide a flat top end liquid proof container.

FIG. 7 is a fragmentary perspective view showing the container of FIG. 6 with a person's thumb operatively engaged with the thumb notch in the hold down tab preparatory to opening the container.

FIG. 8 is a fragmentary perspective view of the container illustrated in FIG. 7, after the hold down tab has been ruptured.

FIG. 9 is a fragmentary perspective view showing the container of FIG. 8 turned around, and with the container in its open position to form a pouring spout.

FIG. 10 is a fragmentary perspective view showing the container of FIG. 9 after the pouring spout has been moved to the closed position to reclose the container.

FIG. 15 is a fragmentary perspective view, similar to FIG. 5, but showing the sealing panels of the top closure structure in an angled position to permit sealing of the central area of the container top end closure structure with the sealing panels in said angled position.

FIG. 16 is a fragmentary perspective view showing a modified flat top container in a closed condition with the hold down tab of the flat top end closure structure provided with another embodiment of a thumb notch release means.

FIG. 17 is a partial layout view of the inside surface of a tab top container blank from which is formed the liquid proof flat top container illustrated in FIG. 16.

FIG. 18 is a fragmentary perspective view showing another modified flat top container in a closed condition with the hold down tab of the flat top end closure structure provided with another embodiment of a thumb notch release means.

FIG. 19 is a partial layout view of the inside surface of a tab top container blank from which is formed the liquid proof flat top container illustrated in FIG. 18.

DESCRIPTION OF THE PREFERRED EMBODIMENTS

Figure 11:
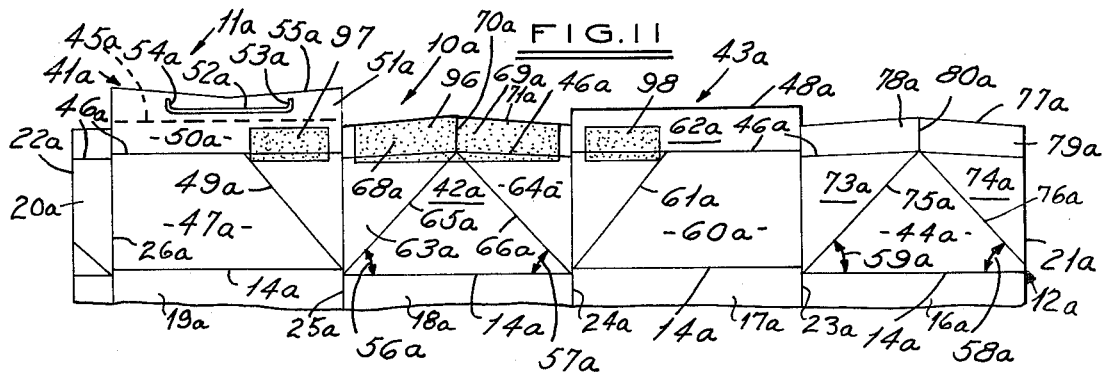
FIG. 11 is a partial layout view of the inside surface of a tab top container blank similar to the container blank shown in FIG. 1, and illustrating an abhesive pattern on the pouring panels of the pouring spout.

Referring now to the drawings, and in particular to FIG. 1, the numeral 10 generally designates a first illustrative embodiment of a tab top container blank made in accordance with the principles of the present invention. The container blank 10 is generally divided into three sections comprising, a flat top end closure generally indicated by the numeral 11, a body portion generally indicated by the numeral 12, and a flat bottom end closure generally indicated by the numeral 13. A staggered or straight lower top major horizontal score line 14 extends transversely across the container blank 10 and separates the flat top end closure 11 and the body portion 12. A bottom major staggered or straight horizontal score line 15 extends transversely across the container blank 10 and separates the flat bottom end closure 13 and the body portion 12. The body portion 12 comprises a plurality of integrally connected body panels 16, 17, 18 and 19, and a side seam flap 20. The container blank 10 is defined on its longitudinal sides by the edges 21 and 22. The body panels 16 through 19, and the side seam flap 20, are defined or formed by the major vertical score lines 23, 24, 25 and 26.

The flat bottom end closure 13 has a pair of external closure panels 27 and 29 which are integral with and extend longitudinally from the body panels 16 and 18, respectively. A pair of triangular closure panels 28 and 30 are an integral part of the flat bottom end closure 13, and they extend longitudinally from the body panels 17 and 19, respectively. The triangular closure panel 28 is defined by the transverse major score line 15 and the bottom diagonal score lines 35 and 36. The triangular closure panel 28 is integrally connected to the external closure panels 27 and 29, by a pair of integral fold back panels 33 and 34, respectively. The triangular closure panel 30 is defined by the major horizontal score line 15 and a pair of bottom diagonal score lines 39 and 40. A pair of integral fold back panels 37 and 38 integrally connect the triangular closure panel 30 to the external closure panel 29 and the side seam flap 20, respectively. As is set forth in more detail hereinafter, the side seam flap 20 is connected to the external full closure panel 27 so as to place the fold back panel 38 adjacent to the external closure panel 27 in a constructed or erected container. As shown in FIG. 1, the external closure panel 27 is not provided with any tuck-in flap, but the external closure panel 29 is provided with an integral overlap flap 32. The details of the bottom end closure 13 are discussed in detail in U.S. Pat. Nos. 3,498,524 issued on Mar. 3, 1970, and 3,120,335 issued on Feb. 4, 1964, and these patents are made reference hereto as part of the present disclosure.

The flat top end closure 11 comprises an outer roof panel, generally indicated by the numeral 41, and an inner roof panel, generally indicated by the numeral 43. The panels 41 and 43 are connected integrally to the upper ends of the body panel members 19 and 17, respectively. A triangular spout panel 42 and a triangular closure panel 44 are connected integrally to the body panels 18 and 16, respectively. A staggered or straight upper top major horizontal score line 46 extends transversely in a position substantially parallel to the horizontal score lines 14 and 15, and it extends from the blank edge 21 to the blank edge 22.

The outer roof panel 41 is divided basically into two portions by the horizontal score line 46. A lower closure panel portion is designated by the numeral 47, and it is defined by the score lines 25, 26, 46 and 14. An opening assist score line 49 extends substantially from the intersection of score line 14 and score line 25 to a point on score line 46 that is closer to the score line 25 than to the score line 26. An upper closure panel portion of the outer roof panel 41 comprises basically two parts, namely a sonic sealing panel 50 and a sealing hold down tab or panel 51. The broken line 45 designates an imaginary dividing line between the panels 50 and 51. The hold down tab 51 is a releasable hold down tab, and it is provided with a thumb notch release means that comprises a formed cut line that extends longitudinally of the hold down tab 51, and comprises a central straight major long cut line 52 that is integral with a pair of end cut lines 53 and 54. The end cut lines 53 and 54 are arcuately formed and extend toward the inwardly extended V-shaped outer edge 55 of the hold down tab 51, so as to form a substantially broad U-shaped cut line that forms a thumb notch release means for releasing the hold down tab 51, as explained more fully hereinafter.

The inner roof panel 43 is divided into two parts by the score line 46. The inner part of the roof panel 43 comprises the lower closure panel 60 which is defined by the horizontal score lines 46, 14 and the vertical score lines 23 and 24. An opening assist score line 61 runs from the intersection of score lines 14 and 24 to a point on score line 46. The last mentioned intersection on score line 46 is closer to score line 24 than score line 23, and it is substantially the same distance from score line 24 as the opening assist score line 49 is from score line 25 along score line 46. The inner roof panel 43 includes an upper closure panel 62 which is integral with the closure panel 60, and it is separated therefrom by the score line 46. The upper outer edge 48 of the closure panel 62 is straight, and square or perpendicular to the score lines 23 and 24.

The triangular spout panel 42 is connected to a pair of fold back panels 63 and 64 by the diagonal score lines 65 and 66, respectively. The fold back panels 63 and 64 connect the triangular spout panel 42 to the closure panels 47 and 60, respectively. A pair of pouring panels or infold lips 68 and 69 are integrally connected to the fold back panels 63 and 64, respectively, and they are defined by the horizontal score line 46, the vertical score lines 24 and 25, and the vertical gable score line 70. As shown in FIG. 1, the upper outer edge of the triangular spout panel 42 is formed with an inverted V-shaped edge 71. The numerals 56 and 57 designate the triangular base angles formed between the diagonal score lines 65 and 66, respectively, and the horizontal score line 14. In the embodiment illustrated in FIG. 1, the triangular base angles 56 and 57 are formed equal or the same, as for example, they are each formed at the same desired angle, as an angle of 46°.

The triangular closure panel 44 is integrally connected to a pair of fold back panels 73 and 74 by the diagonal score lines 75 and 76, respectively. The fold back panel 73 integrally connects the triangular closure panel 44 to the closure panel 60. A pair of closure panels or infold lips 78 & 79 are connected to the fold back panels 73 and 74, respectively, and they are defined at their lower ends by the score line 46 and at their outer edges by the score line 23 and edge 21. The closure panels 78 and 79 are separated from each other by the vertical gable score 80. The triangular base angles formed by the lower ends of the diagonal score lines 75 and 76 and the horizontal score line 14 are indicated by the numerals 59 and 58, respectively, and in the illustrated embodiment of FIG. 1, these angles are equal, as for example, they are both 46°. The upper outer edge 77 of the closure panel 44 is formed as an inverted V-shaped edge. It will be seen that the outer edge heights of the panels or infold lips 68, 69, 78 and 79 are equal or the same at the vertical score lines 25, 24 and 23 and the edge 21, respectively.

The container blank 10 illustrated in FIG. 1 is formed into a side seamed blank as illustrated in FIG. 2, and as designated by the numeral 84. The side seamed blank 84 is formed by rotating the body panel 19 and the side seam flap 20 as a unit about the vertical score line 25, and having the inside surfaces of the body panel 19 come into contact with the inside surface of the body panel 18, and with the vertical score line 26 positioned next to the vertical score line 24, with the inside surface of the side seam flap 20 contacting the inside surface of the body panel 17 adjacent to the vertical score line 24. The body panel 16 is then rotated about the vertical score line 23 to bring its inside surface into contact with the inside surface of the body panel 17. The inside surface of the body panel 16 along the edge 21 comes into contact with the outside surface of the side seam flap 20 and the edge 21 is substantially positioned parallel and aligned with the vertical score line 26. The various members of the flat top end closure 11 and the bottom end closure 13 will make similar movements, and the container will appear as illustrated in FIG. 2. The container blank 10 is then side seamed where the inside area of the body panel 16 comes into contact with the outside surface of the side seam flap 20.

The next step in forming the side seamed blank 84 into a container is illustrated in FIG. 3. FIG. 3 illustrates how the side seamed blank 84 is opened up into a squared condition, after which the flat bottom end closure 13 is formed in a manner well known in the container art, and disclosed in detail in the above cited prior art patents. Generally, in the forming of the flat bottom end closure 13, the triangular closure panels 28 and 30 are moved about the horizontal score line 15 toward the middle of the container. The fold back panels 33–34 and 37–38 rotate about the diagonal score lines 35–36 and 39–40, respectively, and have their outside surfaces come into contact with the outside surfaces of the triangular closure panels 28 and 30. At the same time, external closure panels 27 and 29 are moving towards each other. The various portions of the flat bottom end closure 13 are then heat sealed to form a liquid tight flat bottom end closure structure.

After the bottom end closure 13 is formed, as described above, and a product has been inserted in the container, the various parts of the flat top end closure 11 are folded about the various score lines so as to form the flat top end structure 11. The triangular spout panel 42 is moved around the horizontal score line 14 over the end of the filled container and towards its center. At the same time, the triangular closure panel 44 is moved toward the middle of the filled container about the horizontal score line 14.

The outside surfaces of the pouring panels 68 and 69 will be rotated towards each other about the vertical score line 70, and the closure panels 78 and 79 will have their outside surfaces rotated towards each other about the vertical score line 80. The inside surfaces of the pouring panel 69 and the closure panel 78 will come into contact with the sealing panel 62. The inside surface of pouring panel 68 and closure panel 79 will come into contact with the sealing panel 50.

As viewed in FIG. 4, the last mentioned top closure elements come to a position at an angle to the top end of the body portion 12. The sealing of the last mentioned elements of the top closure 11 is preferably accomplished by a sonic sealing means, because a sonic seal gives a liquid tight seal, and yet said seal is easily opened. The sealing of these various top end closure elements may also be accomplished by other means than a sonic sealing means, if desired.

FIG. 5 illustrates the positions of the various elements of the top end closure 11 when the sonic sealing of the top end closure 11 is effected, and with the sealing panels 50 and 62 being disposed in a position perpendicular to the flat top end of the container. However, the sealing panels 50 and 62 may be disposed in other angular positions during the sonic sealing operation. For example, FIG. 15 shows the sealing panels 50 and 62 disposed in an angled position, for example 30°, to permit the sonic sealing of the central area of the container top end closure structure 11, with said sealing panels in this angled position. The sealing of the last mentioned sealing panels in the angled position of FIG. 15 is desirable in some instances to prevent a tendency of one of the sealing panels to slide relative to the other, and prevent distortion, during the succeeding step of folding over the sealed top end closure 11 into a flat position for sealing the sealing panel 51 to the outer surface of the closure panel 60, in the position shown in FIG. 6.

After the container has been sonically sealed to provide a liquid tight seal, the hold down tab or sealing panel 51 has its inside surface heated, and it is then heat sealed to the outer face of the closure panel 60, which has had its outside surface heated, in a position as illustrated in FIG. 6. The container has now been formed by having the bottom end closure 13 sealed and the product put into the container and the flat top end closure 11 closed and sealed. As illustrated in FIG. 6, the sonic sealed portion has a central sealing rib 86, and the hold down tab or panel 51 has a heat sealed outer sealing portion or rib designated by the numeral 87. The sealing rib 87 is sealed completely along its outer edge to the closure panel 60, and such sealing extends inwardly along a line that is preferably in alignment with the cut line 52 of the thumb notch release means. The numerals 88 and 89 designate broken lines that show the inner edge of the heat seal under the sealing rib 87.

When a consumer wishes to dispense the contents of the filled and sealed container, it is only necessary to insert a thumb, as indicated by the numeral 90 in FIG. 7, into the thumb notch release means formed by the cut lines 52, 53 and 54, and under the unsealed portion of the hold down tab or panel 51. The end of the thumb is then pivoted upwardly while a downward pressure is simultaneously exerted by the underside of the thumb on the portion 91 (FIG. 8) of the hold down tab 51, whereby the hold down tab 51 is ruptured or broken from the outer ends of the cut lines 53 and 54 outwardly. As shown in FIG. 8, the hold down tab 51 is ruptured, and a central portion 91 within the cut lines 52, 53 and 54 is left in an attached position on the outer face of the closure panel 60, and two tab portions or ears 92 and 93 are formed at the opposite ends of the fixed tab portion 91. They remain integral with the rest of the hold down tab 51, but the heat seal between these tab portions or ear portions 92 and 93 is broken, and they move upwardly with the rest of the hold down tab 51 to a position shown in FIG. 8. It will be seen that it is the combination of a downward push on the tab portion 91 and an upward force exerted by a thumb under the hold down tab 51 adjacent the cut line 52 which accomplishes the aforedescribed rupturing and popping up action. It will be seen that the hold down tab or panel 51 is rupturable or frangible hold down means which may be released through the use of the aforedescribed thumb notch release means formed by the cut lines 52, 53 and 54. As illustrated in the aforedescribed embodiment, the thumb notch release means is preferably located in a central position relative to the longitudinal dimension of the hold down tab 51.

After the last described rupturing of the hold down tab 51, the container is in the condition shown in FIG. 8, and it is ready for opening. The central sonic sealing rib 86 will have a tendency to be turned upwards, as viewed in FIGS. 9 and 10, and the consumer will next place his thumb on the edges of the score lines 23 and 24 and exert an inward pressure so as to move the fold back panels 63 and 64 upward to cause the closure panels 47 and 60 to have their ends adjacent the pouring spout rotated about the opening assist score lines 49 and 61. This pushing will cause a popping action or a pulling action to pull the triangular spout panel 42 out of its closed position so that it can be extended into a pouring or dispensing position, as viewed in FIG. 9. The container can be reclosed by moving the triangular spout panel 42 back towards its original position, to a container closed position, as illustrated in FIG. 10.

FIG. 11 is a partial lay-out view of the inside surface of the container blank illustrated in FIG. 1, and showing how an abhesive material may be employed, if desired. The parts of the container blank of FIG. 11 which are the same as the parts of the container blank of FIG. 1 have been marked with the same reference numerals followed by the small letter "a". The numerals 96, 97 and 98 designate desirable abhesive patterns which may be employed on the pouring spout panel portions. It has been found that a wax based material is a desirable abhesive material, and that it gives satisfactory results for such an application.

Figure 12:
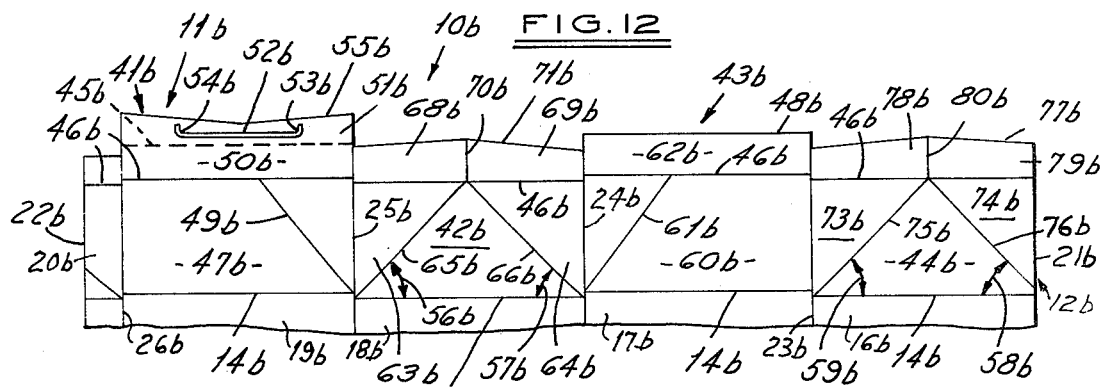
FIG. 12 is a partial layout view of the inside surface of a modified tab top container blank, similar to the container blank shown in FIG. 1, and wherein the triangular fold in panels have equal base angles, and the height dimensions of the edges of the infold lips on said fold in panels are not the same.

FIG. 12 is a partial layout view of the inside surface of a modified tab top container blank, similar to the blank shown in FIG. 1. The parts of the container blank illustrated in FIG. 12 which are the same as the parts of the container blank illustrated in FIG. 1, have been marked with the same reference numerals followed by the small letter "b". In the container blank 10b of FIG. 12, the triangular base angles 65b, 66b, 58b and 59b are all the same, as for example a 46° angle. However, it will be seen that edge height dimensions of the pouring spout panels 68b and 69b are not equal. That is, the edge height of the panel 68b at the vertical score line 25b is greater than the edge height at the outer side of the panel 69b along the score line 24b. The same situation is true relative to the panels 78b and 79b. The outer edge height of the panel 79b along the edge 21b is greater than the edge height at the outer side of the panel 78b along the score line 23b. The last mentioned unequal height dimensions function to make it easier for the top end closure structure 11b to be moved over to an acute angle for sonic sealing of the closure structure. This functional feature is advantageous in larger type containers when the wall thickness of a container blank is increased, due to the increased size of the container. The embodiment of FIG. 12 is provided with the same type of hold down tab and release means as employed in the embodiment of FIG. 1.

Figure 13:
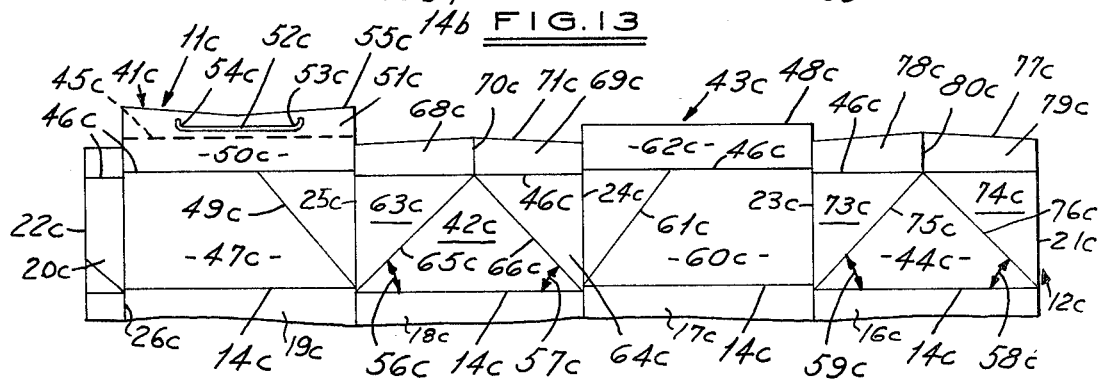
FIG. 13 is a partial layout view of the inside surface of another modified tab top container blank, similar to the container blank shown in FIG. 1, and wherein the triangular fold in panels have unequal base angles, and the height dimensions of the edges of the infold lips on said fold in panels are the same.

FIG. 13 is a partial layout view of the inside surface of a modified tab top container blank, similar to the blank shown in FIG. 1. The parts of the container blank illustrated in FIG. 13 which are the same as the parts of the container blank illustrated in FIG. 1 have been marked with the same reference numerals followed by the small letter "c". In the container blank 10c of FIG. 12, the triangular base angles 65c, 66c, 58c and 59c, are not equal to each other. For example, the triangular base angle 65c is formed to an angle of 46° while the triangular base angle 66c is formed to an angle of 47°. Correspondingly, the triangular base angle 59c is formed to an angle of 47°, and the triangular base angle 58c is formed to an angle of 46°. The outer edge heights of the panels 68c, 69c, 78c and 79c are illustrated as being unequal. The unequal triangular base angles cause the intersection of the adjacent score lines to be off-center, thereby giving different outer edge lengths of the V-shaped panels 42c and 44c, and thus to make a corresponding shift in the pouring angle of the pouring spout. The angular difference assists in the folding over of the top closure structure 11c. The embodiment of FIG. 13 is provided with the same type hold down tab and release means as employed in the embodiment of FIG. 1.

Figure 14:
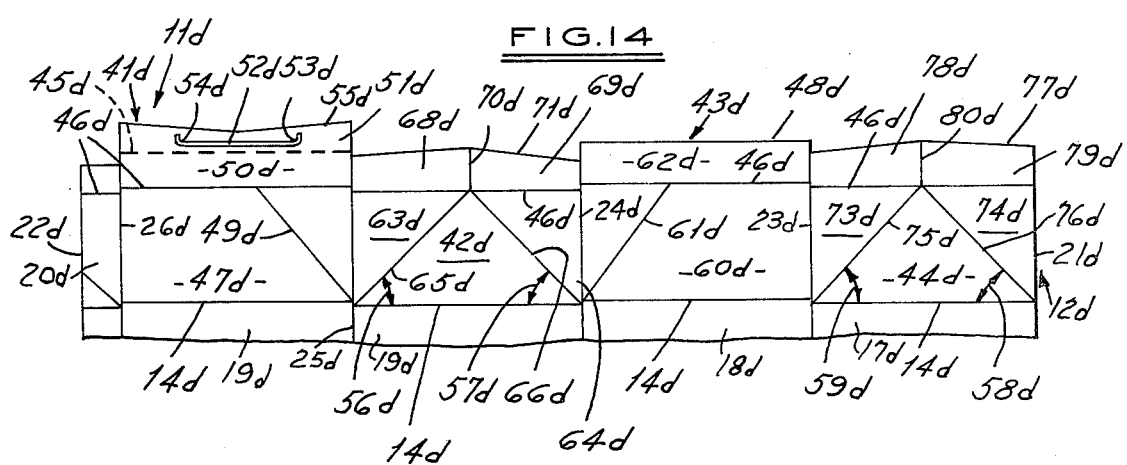
FIG. 14 is a partial layout view of the inside surface of another modified tab top container blank, similar to the container blank shown in FIG. 1, and wherein the triangular fold in panels have unequal base angles, and the height dimensions of the edges of the infold lips on said fold in panels are not the same.

FIG. 14 is a partial layout of the inside surface of a modified tab top container blank, similar to the blank shown in FIG. 1. The parts of the container blank illustrated in FIG. 14 which are the same as the parts of the container blank illustrated in FIG. 1, have been marked with the same reference numerals followed by the small letter "d". In the container blank 10d of FIG. 14, the triangular base angles 65d and 66d are unequal. That is, the triangular base angles 65d may be made to an angle of 46°, while the triangular base angle 57d is made to an angle of 47°. The corresponding triangular base angles 59d and 58d are made to angles of 47° and 46°, respectively. The unequal triangle base angles give the aforementioned assist in the folding over of the top closure structure 11d. The container blank illustrated in FIG. 14 also is provided with the unequal edge height dimensions on the pouring spouts 68d, 69d, 78d and 79d in the same manner as described hereinbefore under the discussion of the embodiment of FIG. 12. The embodiment of FIG. 14 is provided with the same hold down tab and release means as employed in the embodiment of FIG. 1.

FIGS. 16 and 17 illustrate a container which is provided with another embodiment of a thumb notch release means made in accordance with the principles of the present invention. The parts of the container blank illustrated in FIGS. 16 and 17 which are the same as the corresponding parts of the container blank illustrated in FIG. 1, have been marked with the same reference numerals followed by the small letter "e". In the embodiment of FIGS. 16 and 17, the thumb notch release means is formed as an I-shaped set of cut lines 52e, 53e and 54e. The cut line 52e is elongated and is disposed longitudinally of the hold down tab or panel 51e. The cut lines 53e and 54e are disposed at opposite ends of the elongated longitudinal cut line 52e and they are connected thereto, but they are disposed perpendicular to the longitudinal axis of the hold down tab 51e. It will be understood that the thumb notch release means illustrated in FIGS. 16 and 17 functions in the same manner as the first described embodiment illustrated in FIGS. 1 through 8. The numerals 88e and 89e show the inner edge of the heat seal or tack seal which is aligned with the cut line 52e so as not to seal the portion of the tab 51e inwardly of the cut line 52e. It will be understood that when a user's thumb is inserted into the cut line 52e and pivoted to provide the aforedescribed upward and downward forces, that the frangible or rupturable hold down tab 51e will be ruptured in the same manner as the first described embodiment to provide the remaining fixed portion 91e and the attached ears or tab portions 92e and 93e.

FIGS. 18 and 19 illustrate a container which is provided with still another embodiment of a thumb notch release means made in accordance with the principles of the present invention. The parts of the container blank illustrated in FIGS. 18 and 19 which are the same as the corresponding parts of the container blank illustrated in FIG. 1, have been marked with the same reference numerals followed by the small letter "f". In the embodiment of FIGS. 18 and 19, the thumb notch release means is formed as a concave arcuate recess in the outer edge of the hold down tab or panel 51f. The inner edge of the heat seal or tack seal is indicated by the numerals 88f and 89f, and said inner edge is disposed so that the inner portion 52f of the edge of the concave recess is not tacked or sealed down. On the other hand, the outer arcuate ends of the concave recess edge are tacked to the closure panel 60f. The concave recess forming the thumb notch release means of FIGS. 18 and 19 is thus formed by an arcuate cut line having the connected portions 52f, 53f and 54f.

It will be understood that the thumb notch release means illustrated in FIGS. 18 and 19 functions in the same manner as the first described embodiment illustrated in FIGS. 1 through 8, and the embodiment illustrated in FIGS. 16 and 17. It will be understood that when a user's thumb is inserted under the cut line portion 52f, and pivoted upwardly, an upward pressure and a downward pressure is exerted on the top end closure structure, whereby the hold down tab 51f is moved upwardly to a released position with the attached ears or tab portions 92f and 93f.

Figure 20:
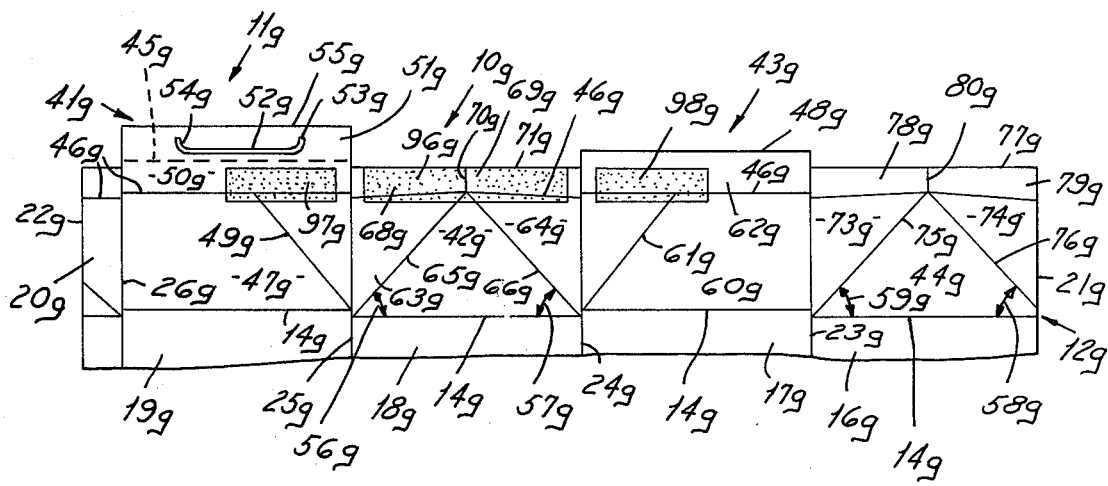
FIG. 20 is a partial layout view of the inside surface of a tab top container blank similar to the container blank shown in FIG. 11, illustrating a modified abhesive pattern on the pouring panels of the pouring spout, and showing straight or flat end edges on all of the panels.

FIG. 20 is a partial layout of the inside surface of a further modified tab top container blank, similar to the blank shown in FIG. 1. The parts of the container blank illustrated in FIG. 20 which are the same as the parts of the container blank illustrated in FIG. 1, have been marked with the same reference numerals followed by the small letter "g". In the container blank 10g of FIG. 20, the top upper edges are 55g, 71g, 48g and 77g of the blank fold panels 47g, 65g, 60g and 44g, respectively, are all straight or flat along their upper edges. However, it will be understood that the upper edge 55g for the panel 47g may be provided with a V-shaped upper end edge in the same manner as the embodiment illustrated in FIG. 1, with the rest of the panels having straight or flat upper end edges. FIG. 20 also illustrates a modified abhesive pattern on the pouring panels of the pouring spout, which shows the abhesive pattern extending beyond the centers of the panels 47g and 60g.

Although the container blanks shown in FIGS. 11, 12, 13, 14 and 20 have been illustrated with the first thumb notch release means embodiment, it will be understood that these container blanks may also employ the thumb notch release means embodiments illustrated in FIGS. 16 and 18. It will also be understood that the thumb notch release means of the present invention may take other forms than those illustrated in FIGS. 1, 16 and 18.

It will be seen that the novel container blank of the present invention provides a blank which has a short closure top, wherein the closure panel 47, with the attached sealing panel 50 and hold down tab or sealing panel 51, is shorter in overall combined length than the corresponding structure in the prior art container blanks, whereby the container blank of the present invention may be made with much less paper, thereby entailing a saving in paper. It has also been found that the container blank of the present invention, because of the V-shaped outer edge 55 on the last mentioned closure panel, permits optimum nesting of the container blanks when the blanks are formed, thereby reducing scrap in the making of the container blanks and resulting in an additional saving of paper. This last mentioned nesting effect is due to the fact that the V-shaped edge 55 is adapted to receive the V-shaped edges 71 and 77 on adjacent container blank forms during the forming of the blanks.

Figure 21:
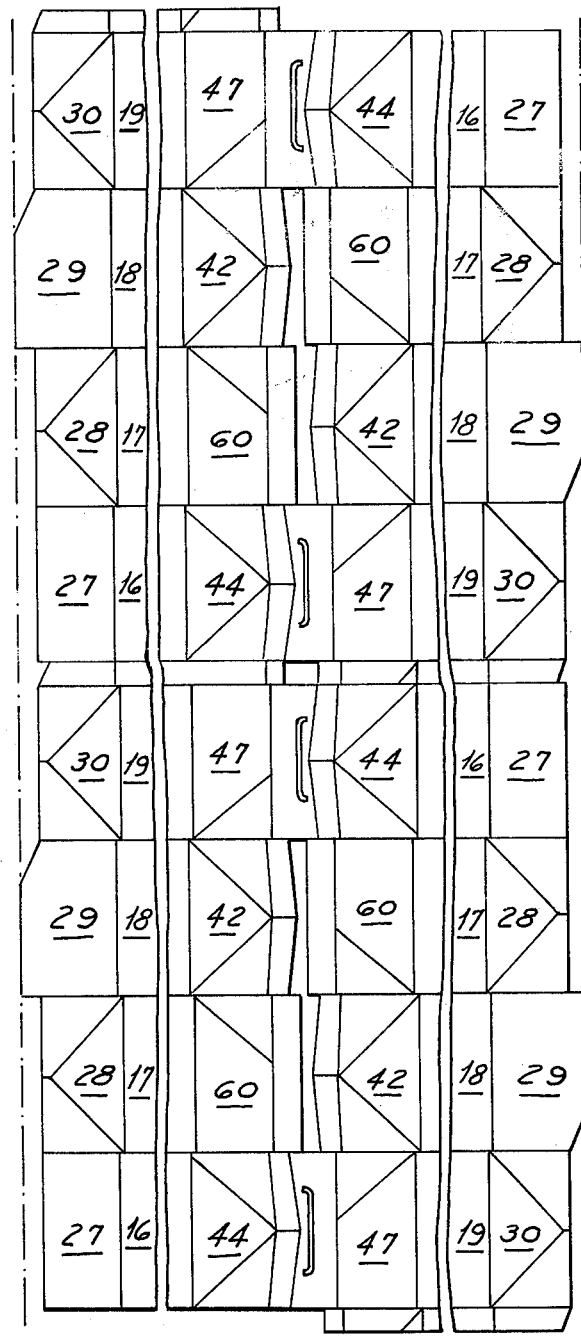
FIG. 21 illustrates the optimum nesting of the container blanks of the present invention wherein the blanks are nested in pairs as a double web strand of blanks.
Figure 22:
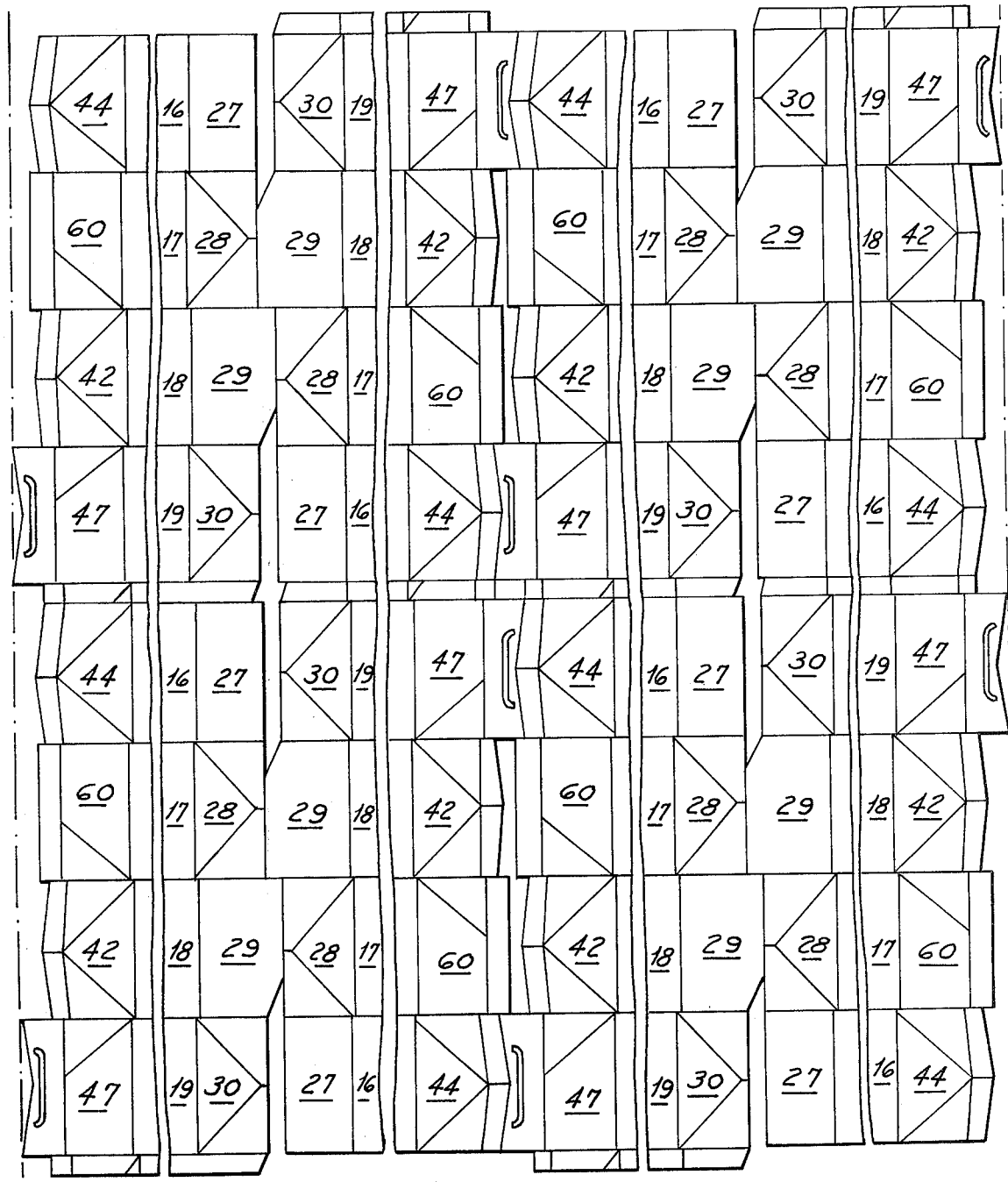
FIG. 22 illustrates the optimum nesting of the container blanks of the present invention wherein the blanks are nested in fours as a quadruple web strand of blanks.

FIGS. 21 and 22 illustrate the novel nesting ability of the container blanks of the present invention during the cutting and scoring operations for forming the container blanks. FIG. 21 illustrates a nesting arrangement wherein the container blanks are nested in pairs, as a double width strand of blanks. FIG. 22 illustrates the nesting of the blanks wherein the blanks are nested in fours, as a quadruple web strand of blanks. It will be seen in FIGS. 21 and 22 that the dash-dot lines along the edges of the nesting arrangement illustrate the edges of a continuous web of paper from which the container blanks are cut and scored, and thus formed. It will be seen that the container blank of the present invention permits a plurality of containers to be simultaneously cut and scored with a minimum of scrap paper. The only loss of paper or scrap is that which appears between the outer ends of the container blanks and the dash-dot lines, and the paper which is not used between the inner ends of the panels 42 and 60, as well as the small amount of paper not used between the inner ends of the seam panel. In the nesting illustration of FIG. 21, the panels are formed with their top ends abutting each other. In the nesting arrangement illustrated in FIG. 22, a second pair of containers are mounted along the structure of FIG. 21 to form the structure of FIG. 22, with the bottom ends of the containers in abutting relation to make a quadruple web strand of blanks wherein four blanks are formed across the paper web simultaneously. It will be understood that any number of blanks could be formed simultaneously crosswise of a paper web from which the blanks are formed, as for example, 2, 3, 4 and so forth, depending on the size of the container blanks being formed. It will be understood that the larger the container, the fewer the number of container blanks that can be cut transversely of a paper web.

The various embodiments of the thumb notch release means have been centrally located lengthwise of the hold down tabs, but it will be understood that in some instances, it may be desirable to locate the release means in an off-center or different intermediate position interposed between the ends of the hold down tab. It will also be understood that the sealed portion 87 of the hold down tab 51 comprises a small sealing web which may vary in accordance with the width of the hold down tab 51 and the shape of the particular cut lines employed in a thumb notch release means.

As employed herein, the term "sonic seal" is intended to include seals which are made by the employment of sonic vibrations, or ultrasonic vibrations beyond or higher than 18,000 cycles per second (18,000 Hertz). That is, the horn which is the hammer or working piece of a sealing system may be vibrated electrically to produce mechanical vibrations in the sonic range or the ultrasonic range.

While it will be apparent that the preferred embodiments of the invention herein disclosed are well calculated to fulfill the objects above stated, it will be appreciated that the invention is susceptible to modification, variation and change.

What is claimed is:

1. In a paperboard container, the combination, comprising:
   (a) a tubular body having a flat top and closure thereon;
   (b) said flat top end closure overlying said body, and including first and second triangular panel members folded flat over the top end of said body, and a pair of rectangular shaped panels defined as inner and outer roof panels which are folded over said triangular panel members;
   (c) each of said triangular panel members is flanked by a pair of fold back panels which join said triangular panel members to said inner and outer roof panels;
   (d) first and second pouring panels as part of said fold back panels flanking said first triangular panel member;
   (e) first and second closure panels as part of said fold back panels flanking said second triangular panel member;
   (f) a sealing rib including said inner and outer roof panels, said first and second pouring panels and said first and second closure panels;
   (g) a hold down tab sealing the outer roof panel to said inner roof panel;
   (h) said hold down tab being provided with release means for separating the hold down tab from the inner roof panel;
   (i) said release means comprises a thumb notch release means;
   (j) said hold down tab is frangible and it is ruptured when the hold down tab is separated from the inner roof panel and seal edge members are positioned at the ends of said hold down tab; and
   (k) said release means comprises a cut line extending longitudinally of the hold down tab and lies between said hold down tab seal edge members.

2. A paperboard container as defined in claim 1 wherein:
   (a) said release means cut line includes an elongated straight portion and a pair of arcuate end portions.

3. A paperboard container as defined in claim 1, wherein:
   (a) said release means cut line includes an elongated straight portion and a pair of straight end portions.

4. A paperboard container as defined in claim 1, wherein:
   (a) said release means comprises a notch formed in the outer end edge of the hold down tab and open to the exterior of the tab.

5. A paperboard container as defined in claim 1, wherein:
   (a) the outer end edge of the hold down tab is recessed inwardly.

6. A paperboard container as defined in claim 5, wherein:
   (a) said recess in the outer end edge of the hold down tab is V-shaped.

7. A paperboard container as defined in claim 1, wherein:
   (a) said first and second triangular panel members have equal size base angles.

8. A paperboard container as defined in claim 1, wherein:
   (a) said first and second triangular panel members have unequal size base angles.

9. A paperboard container as defined in claim 1, wherein:
   (a) the edge height dimensions of each pair of fold back panels are the same.

10. A paperboard container as defined in claim 1, wherein:
    (a) the edge height dimensions of each pair of fold back panels are unequal.

11. A blank for a flat ended container of foldable material having overall surfaces of thermoplastic material that becomes adhesive when subjected to heat, said blank comprising the combination of:
    (a) a plurality of body side panels;

(b) bottom end closure elements connected to the lower ends of said body side panels;

(c) an outer roof panel connected to the top end of one of said body side panels as an extension thereof, and an inner roof panel connected to the top end of an alternate one of said body panels as an extension thereof;

(d) a pair of triangular end panels connected to the top ends of a second pair of alternate ones of said body side panels as extensions thereof;

(e) a pair of triangular fold-in panels flanking each of said triangular end panels;

(f) a pair of pouring spout panels connected to each of said pair of triangular fold-in panels on one of said triangular end panels;

(g) a pair of closure panels connected to the other of said pair of triangular fold-in panels on the other of said triangular end panels;

(h) each of said roof panels being provided with a diagonal score line to form part of a pouring spout;

(i) a side-seam flap connected along one side of one of said body side panels;

(j) a sealing panel connected to the outer end of said outer roof panel;

(k) a hold down tab connected to the outer end of said sealing panel;

(l) an upper closure panel connected to the outer end of said inner roof panel;

(m) said hold down tab is provided with a release means;

(n) said release means comprises a thumb notch release means;

(o) seal edge members are positioned at the ends of said hold down tab and connected by said thumb notch release means; and (p) said release means comprises a cut line extending longitudinally of the hold down tab and lies between said hold down tab seal edge members.

12. A container blank as defined in claim 11, wherein:
(a) said release means cut line includes an elongated straight portion and a pair of arcuate end portions.

13. A container blank as defined in claim 11, wherein:
(a) said release means cut line includes an elongated straight portion and a pair of straight end portions.

14. A container blank as defined in claim 11, wherein:
(a) said release means comprises a notch formed in the outer end edge of the hold down tab and open to the exterior of the tab.

15. A container blank is defined in claim 11, wherein:
(a) the outer end edge of the hold down tab is recessed inwardly.

16. A container blank as defined in claim 15, wherein:
(a) said recess in the outer end edge of the hold down tab is V-shaped.

17. A container blank as defined in claim 11, wherein:
(a) said triangular end panel members have equal size base angles.

18. A container blank as defined in claim 11, wherein:
(a) said triangular end panel members have unequal size base angles.

19. A container blank as defined in claim 11, wherein:
(a) the edge height dimensions of each pair of fold back panels are the same.

20. A container blank as defined in claim 11, wherein:
(a) the edge height dimensions of each pair of fold back panels are unequal.

21. A plurality of nested paperboard container blanks, of the type defined in claim 11, wherein:
(a) the blanks are nested in a plurality of blanks transversely of a paper web from which the blanks are formed and in abutting relationship in a plural strand arrangement.

22. A plurality of nested paperboard container blanks of the type defined in claim 21 wherein:
(a) each pair is disposed with the top ends in abutting relationship, and with adjacent pairs in side to side abutting relationship, and in a double width strand arrangement.

23. A plurality of nested paperboard container blanks of the type defined in claim 11, wherein:
(a) the blanks are nested in multiples of four transversely of a paper web from which the blanks are formed with the top ends of the two inner blanks being in abutting relationship, and with the bottom ends of the two outer blanks being in abutting relationship of the bottom ends of the two inner blanks, to form a quadruple width strand arrangement.

* * * * *